United States Patent [19]

Lyons et al.

[11] Patent Number: 5,325,026
[45] Date of Patent: Jun. 28, 1994

[54] MICROPROCESSOR-BASED COMMUTATOR FOR ELECTRONICALLY COMMUTATED MOTORS

[75] Inventors: James P. Lyons, Niskayuna; Stephen R. MacMinn, Schenectady; Anantha K. Pradeep, Clifton Park, all of N.Y.

[73] Assignee: General Electric Company, Schenectady, N.Y.

[21] Appl. No.: 906,173

[22] Filed: Jun. 29, 1992

[51] Int. Cl.$^5$ .............................................. G11B 21/08
[52] U.S. Cl. ..................................... 318/254; 318/439; 318/561
[58] Field of Search ............... 318/701, 802, 803, 805, 318/807, 809, 561, 254, 432, 632, 439, 138, 798

[56] References Cited

U.S. PATENT DOCUMENTS

| | | | |
|---|---|---|---|
| 3,883,785 | 5/1975 | Fulcher et al. | 318/254 |
| 4,366,422 | 12/1982 | Rhodes | 318/632 |
| 4,442,393 | 4/1984 | Abbondanti | 318/805 |
| 4,458,321 | 7/1984 | Whitney et al. | 318/561 |
| 4,499,413 | 2/1985 | Izosima et al. | 318/802 |
| 4,639,651 | 1/1987 | Shimizu | 318/432 |
| 4,713,745 | 12/1987 | Schauder | 318/809 |
| 4,739,240 | 4/1988 | MacMinn et al. | 318/696 |
| 4,772,839 | 9/1988 | MacMinn et al. | 318/696 |
| 4,792,870 | 12/1988 | Pinson | 318/561 |
| 5,097,190 | 3/1992 | Lyons et al. | 318/701 |
| 5,107,195 | 4/1992 | Lyons et al. | 318/701 |
| 5,128,813 | 7/1992 | Lee | 318/561 |

OTHER PUBLICATIONS

"A State Observer for the Permanent-Magnet Synchronous Motor", Jones et al., Proceedings of IECON '87, Nov. 2-6, Cambridge, Mass.

"Variable Reluctance Machine Control", M. Chow, PhD Thesis, Cornell University, Department of Electrical Engineering, Aug. 1987.

"A State Observer for Variable Reluctance Motors: Analysis and Experiments", Lumsdaine et al. Proceedings of the 19th Asilomar Conference on Circuits, Systems & Computers, Pacific Grove, Calif., Nov. 6-8, 1985.

"State Observers for Variable Reluctance Motors", A. Lumsdaine et al., IEEE Transactions on Industrial Electronics, vol. 37, No. 2, Apr. 1990, pp. 133-142.

"A Simple Motion Estimator for Variable-Reluctance Motors", Harris et al., IEEE Transactions on Industry Applications, vol. 26, No. 2, Mar./Apr. 1990, pp. 237-243.

*Primary Examiner*—William M. Shoop, Jr.
*Assistant Examiner*—John W. Cabeca
*Attorney, Agent, or Firm*—Jill M. Breedlove; Marvin Snyder

[57] ABSTRACT

A commutator for an electronically commutated machine provides a microprocessor-based mechanism for translating discrete samples of machine angular rotor position information, either measured or determined indirectly, into commutation signals. Commutation control is achieved with shaft position information available only at discrete time instants, which are not, in general, the required commutation times. A filter and state observer provide estimates of the mechanical states of the rotating machine, i.e., angular position, velocity and acceleration. In one embodiment, a Kalman filter of variable gain is used for estimating the mechanical states. In another embodiment, a sliding mode observer is used for estimating the mechanical states. In the preferred embodiment, a combination of a sliding mode observer and a steady state Kalman filter is used to obtain the mechanical state estimates; the Kalman filter with small constant gains provides smooth tracking of a steadily rotating machine, while the sliding mode observer provides fast acquisition during transient conditions.

12 Claims, 6 Drawing Sheets

MICROPROCESSOR-BASED COMMUTATOR FOR ELECTRONICALLY COMMUTATED MOTORS

FIELD OF THE INVENTION

The present invention relates generally to state estimators for estimating position, velocity and acceleration of a rotating machine and, more particularly, to microprocessor-based commutation of an electronically commutated machine which may be useful, for example, in a phase commutation scheme without a shaft position sensor.

BACKGROUND OF THE INVENTION

Phase current commutation in electric motors is typically accomplished by feeding back a rotor position signal to a controller from a shaft angle transducer, e.g. an encoder or a resolver. To improve reliability and to reduce size, weight, inertia and cost in electric motor drives, however, it is desirable to eliminate the shaft angle transducer. In a switched reluctance motor drive, for example, methods for indirectly determining rotor position without using a shaft angle transducer have been described in U.S. Pat. No. 5,097,190 of J. P. Lyons and S. R. MacMinn, and U.S. Pat. No. 5,107,195 of J. P. Lyons, M. A. Preston and S. R. MacMinn, both assigned to the instant assignee. Measurements from indirect rotor position sensors may be noisy and, in general, are not continuously available. In particular, measurements are available only at discrete instants in time as dictated by microprocessor sampling and calculation requirements which will not, in general, coincide with the desired commutation times for the electric machine. Therefore, it is necessary to process and translate such noisy position measurements into reliable phase current commutation times occurring at the appropriate instants.

SUMMARY OF THE INVENTION

A commutator according to the present invention provides a microprocessor-based mechanism for translating discrete samples of machine angular rotor position information, either measured or determined indirectly, into commutation signals for an electronically commutated machine (ECM). Commutation control is achieved with shaft position information available only at discrete time instants, which are not, in general, the required commutation times.

According to the present invention, a filter and state observer provide estimates of the mechanical states of the rotating machine, i.e., angular position, velocity and acceleration. In one embodiment, a Kalman filter of variable gain is used for estimating the mechanical states. In another embodiment, a sliding mode observer is used for estimating the mechanical states. In the preferred embodiment, a combination of a sliding mode observer and a steady-state Kalman filter is used to obtain the mechanical state estimates; the Kalman filter with small constant gains provides smooth tracking of a steadily rotating machine, while the sliding mode observer provides fast acquisition during transient conditions.

The commutator according to the present invention further comprises a means of processing the mechanical state estimates into machine phase commutation signals. In one embodiment, a phase-locked-loop forces a hardware counter to track and interpolate between the discrete time position estimates. In particular, the hardware counter's output emulates the output of, for example, a resolver-to-digital (R/D) converter and thus can be directly used in a variety of hardware commutation schemes. In the preferred embodiment, commutation control software translates desired commutation angles and mechanical state estimates into commutation event times which are loaded into hardware counters for triggering actual phase commutation upon expiration thereof.

The present invention may be advantageously employed within a "sensorless" commutation scheme for an ECM, such as, for example, a switched reluctance motor.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
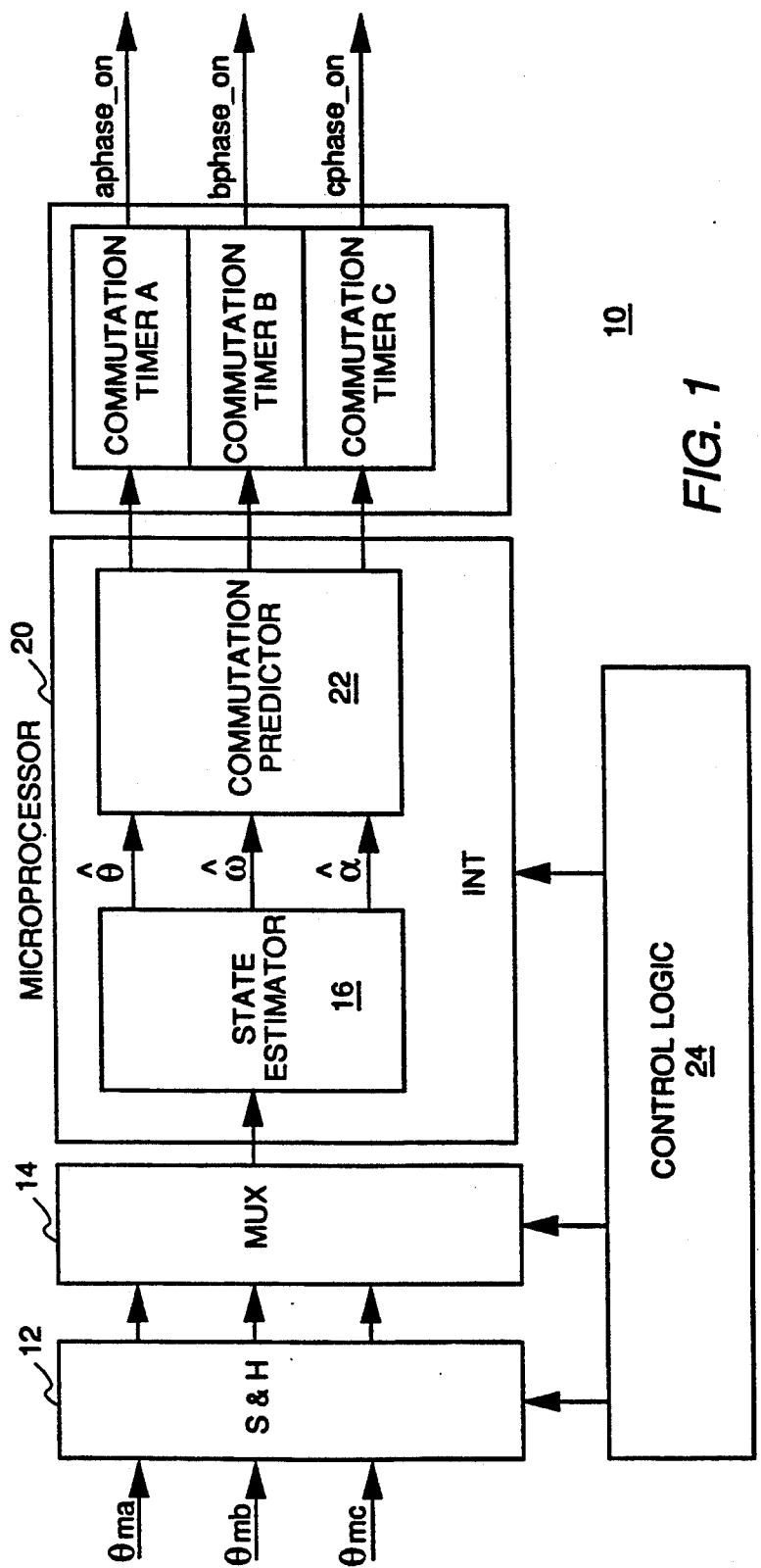
FIG. 1 is a block diagram of a commutator according to the present invention.

FIG. 1 illustrates a commutator 10 according to the present invention. Commutator 10 receives noisy position measurements $\theta_{ma}$, $\theta_{mb}$ and $\theta_{mc}$ from a rotor position estimator (not shown), such as, for example, of a type described in U.S. Pat. No. 5,097,190 or U.S. Pat. No. 5,107,195, cited hereinabove. The noisy position measurements are sampled by a sample-and-hold (S&H) circuit 12 and supplied, via a multiplexer (MUX) 14, to a state estimator 16 implemented in a microprocessor 20. By way of example, the commutator of the present invention is described with reference to a three-phase electronically commutated motor (ECM), although it is to be understood that the principles of the commutation scheme of the present invention are not limited to three phases. State estimator 16 is formulated to provide state estimates of rotor angular position $\theta$, velocity $\omega$, and acceleration $\alpha$. According to the embodiment of FIG. 1, the state estimates of position $\theta$, speed $\omega$ and acceleration $\alpha$ are provided to a commutation predictor 22 which predicts the time interval to the next commutation event for each of the machine phases A, B and C. In particular, the commutator predictor calculates the time to the next commutation event $t_{com}$ approximately as follows:

$$t_{com} = \left[ \frac{(\theta_{com} - \theta) \bmod 2\pi}{\omega} \right]$$

or optionally for greater accuracy as:

$$t_{com} = \max \left[ \frac{\omega \pm \sqrt{\omega^2 + 2\alpha(\theta_{com} - \theta) \bmod 2\pi}}{\alpha} \right]$$

where $\theta_{com}$ represents the commutation position corresponding to the commutation time $t_{com}$. The time $t_{com}$ for each phase is loaded into the respective hardware commutation timer A, B or C, respectively corresponding to phases A, B and C of the ECM, in order to precisely determine the commutation instants of each phase. The control logic for controlling commutator 10 is designated generally by block 24 and is shown as having control inputs to S&H 12, MUX 14, and microprocessor 20.

Figure 2:
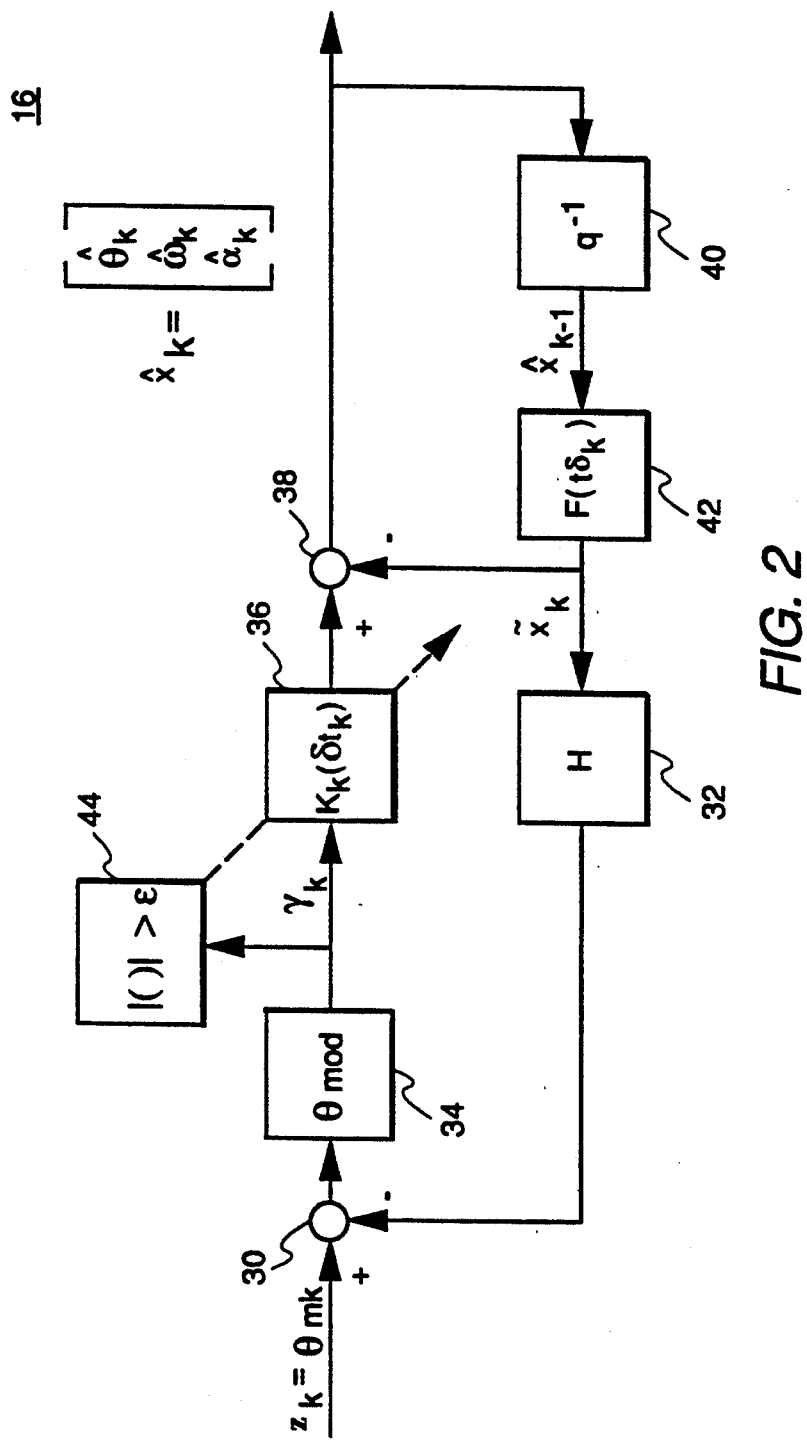
FIG. 2 is a block diagram of mechanical state estimator state employing a Kalman filter useful in the commutator of FIG. 1 according to one embodiment of the present invention.

FIG. 2 illustrates one embodiment of state estimator 16 comprising a Kalman filter of variable gain which is used for both acquiring and tracking the noisy position measurements $\theta_{mk}$. The Kalman filter processes the noisy position measurements $\theta_{mk}$ and generates state estimates of position $\theta_k$, speed $\omega_k$, and acceleration $\alpha_k$. In particular, the state equations for a machine rotating with constant angular acceleration subject to noise perturbations can be formulated as:

$x = Ax + Bw$, where w represents plant noise and $$x = \begin{bmatrix} \theta \\ \omega \\ \alpha \end{bmatrix};$$

$$A = \begin{bmatrix} 0 & 1 & 0 \\ 0 & 0 & 1 \\ 0 & 0 & 0 \end{bmatrix};$$

$$B = \begin{bmatrix} 0 \\ 0 \\ 1 \end{bmatrix}.$$

Assuming noisy measurements of angular position are available, a measurement equation can be formulated as:

$z = Hx + v$, where $H = [1\ 0\ 0]$, where measurement noise v is assumed to be white gaussian noise with zero mean and variance $R = \sigma_x^2$.

The plant noise is assumed to be white gaussian noise with zero mean and variance $Q = \sigma_a^2$. The unknown but bounded input to the plant is now treated as a plant noise. In addition, it is assumed that the noise terms v and w are uncorrelated.

The continuous state propagation equations are discretized using a zero-order hold (ZOH) and are represented as:

$x_{k+1} = F(\delta t)x_k + Gw_k$, where $$x_k = \begin{bmatrix} \theta_k \\ \omega_k \\ \alpha_k \end{bmatrix};$$

$$F(\delta t) = \begin{bmatrix} 1 & \delta t & \frac{\delta t^2}{2} \\ 0 & 1 & \delta t \\ 0 & 0 & 1 \end{bmatrix};$$

$$G(\delta t) = \begin{bmatrix} \frac{\delta t^3}{6} \\ \frac{\delta t^2}{2} \\ \delta t \end{bmatrix}.$$

The discrete samples are not necessarily regularly spaced in time; consequently, the transition matrices are functions of $\delta t = t_{k+1} - t_k$, where $t_k$ and $t_{k+1}$ represent the sampling instants.

The measurement equation can be represented in discrete form as:

$z_k = Hx_k + v_k$, where $H = [1\ 0\ 0]$.

From the discrete state and measurement equations, the Kalman filter can be formulated to estimate the rotor angular position, velocity, and acceleration, subject to the specified plant and measurement noises. That is, the Kalman filter can be recursively formulated as:

$\delta t_k = t_k - t_{k-1}$ $P_k = F(\delta t_k)P_{k-1}F(\delta t_k)^T + G(\delta t_k)QG(\delta t_k)^T$ $K_k = P_k H^T(HP_kH^T + R)^{-1}$ $x_k = F(\delta t_k)x_{k-1}$ $x_k = K_k(z_k - Hx_k)$ $P_k = (I - K_kH) P_k$, where $P_k$ represents the covariance matrix of the Kalman filter; and $K_k$ represents the Kalman gains.

Since the state variable $\theta$ assumes values in the range from 0 to $2\pi$, it is necessary to define a consistent means of determining the innovation $\delta_k$ from values of $\theta$ and $\hat{\theta}$. To this end, a function $\theta$mod is defined to be $\theta \bmod = (\theta \bmod 2\pi) - \pi$, where the estimation error $\tilde{\theta} = \theta - \hat{\theta}$.

From the equation for $\theta$mod, it is evident that given values of $\theta$ and $\hat{\theta}$, there are two possible values for the estimation error $\tilde{\theta}$. However, given bounds on rotor velocity and sampling-rate, and assuming that the velocity estimate $\omega$ is close to its actual value, it is possible to choose the appropriate value of $\tilde{\theta}$. If the innovations $\delta_k$ are such that two consecutive innovation errors exceed a large bound on the error, then that innovation sequence is dismissed, and the velocity estimate is reinitialized once again.

The Kalman filter equations set forth hereinabove are implemented according to the block diagram of FIG. 2. In particular, each noisy measurement $\theta_{mk}$ is compared in a summer 30 to the a priori predicted measurement $Hx_k$ from a block 32. The prediction error signal output from summer 30 is provided to block 34 for performing the θmod function thereon. The innovation signal output $\gamma_k$ from block 34 is provided to a block 36 for multiplication by the Kalman gain $K_k$. The output signal from block 36 is a vector correction which is added to the a priori state vector estimate $x_k$ in a summer 38, resulting in the a posteriori estimate $x_k$. The estimate is delayed by a unit delay operator 40, yielding $x_{k-1}$, which is multiplied by the state transition matrix function $F(\delta t_k)$ in a block 42, resulting in the a priori state estimate vector $x_k$.

In the embodiment of FIG. 2, a thresholding technique is preferably employed to determine whether the unmodeled inputs to the system being tracked have changed suddenly. In particular, according to the thresholding technique, the covariance matrix $P_x$ is reset when the innovation signal $\gamma_k$ exceeds a predetermined value of $\epsilon$, as indicated by block 44 and the dashed line in FIG. 2. It is to be understood that the initial values of the covariance matrix $P_k$ and the Kalman gains $K_k$ are initially chosen by the designer.

Figure 3:
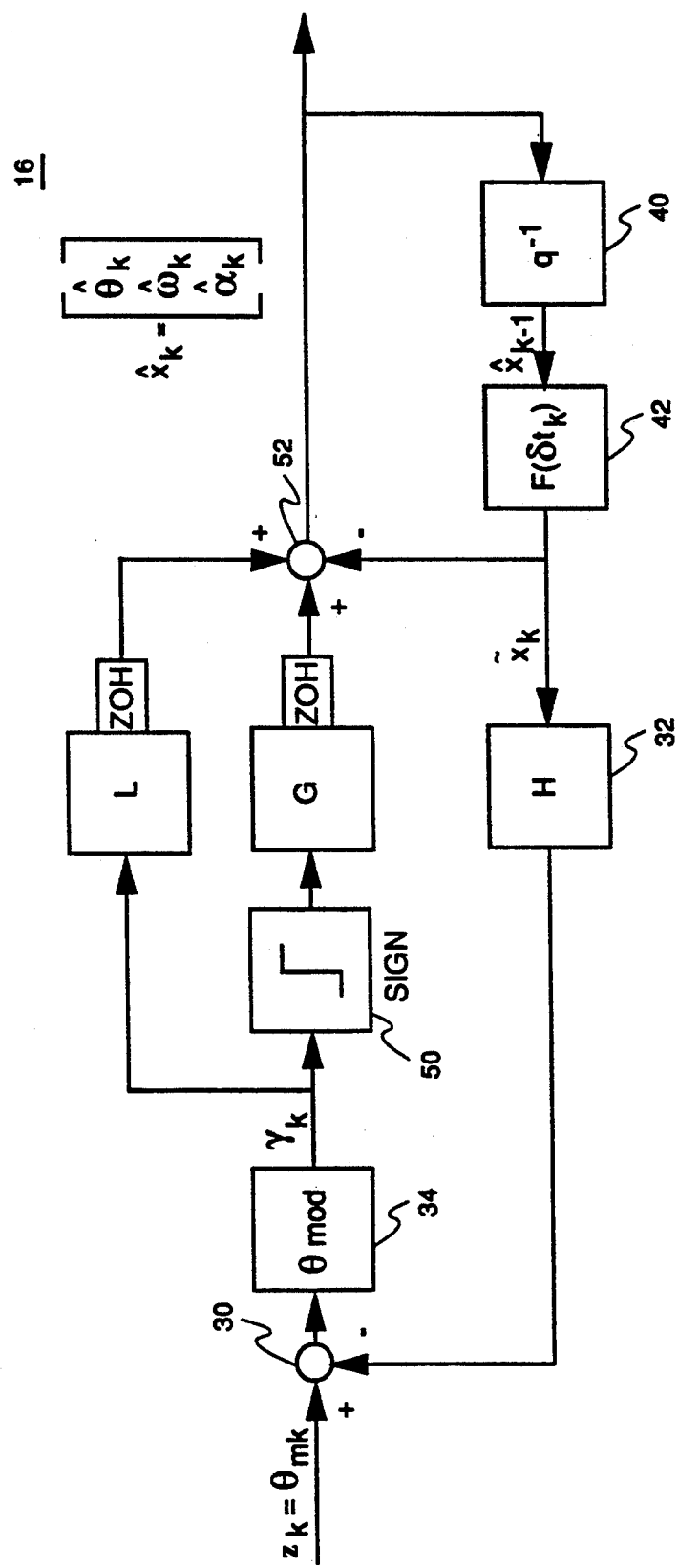
FIG. 3 is a block diagram of mechanical state estimator state employing a sliding mode observer useful in the commutator of FIG. 1 according to an alternative embodiment of the present invention.

In an alternative embodiment, as illustrated in FIG. 3, state estimator 16' comprises a sliding mode observer which is used to both acquire and track the noisy position measurements. The sliding mode observer processes the position measurements $\theta_{mk}$ and generates estimates of position $\theta$, speed $\omega$, and acceleration $\alpha$.

The sliding mode observer equations are as follows:

$$\theta = \omega + l_\theta \theta + g_\theta \text{sign}[\theta]$$

$$\omega = \alpha + l_\omega \omega + g_\omega \text{sign}[\theta]$$

$$\alpha = l_\alpha \alpha + g_\alpha \text{sign}[\alpha]$$

$$\theta = \theta \text{mod}(\theta - \theta)$$

As shown in FIG. 3, the innovation $\gamma_k$ from the θmod block 34 is provided to a sign function block 50. The sign function is a set-valued function that takes values in the closed interval $[-1,1]$. The output signal from the sign function block 50 is provided to a gain block G. In particular, using sliding mode observer theory, it can be shown that there exists a choice of gains $g_\theta$, $g_\omega$ and $g_\alpha$ that ensure acquisition of the state estimates. The observer gains satisfy the following criteria:

$$g_\theta \geq \omega_{max};$$

$$g_\omega \geq \alpha_{max}; \text{ and}$$

$$g_\alpha \geq F_{max},$$

where the variables with the subscript max refer to the maximum values that the physical variables can assume, with $F_{max}$ representing the maximum change in acceleration. In vector form, $$G = \begin{bmatrix} g_\theta \\ g_\omega \\ g_\alpha \end{bmatrix}.$$

As shown in FIG. 3, the innovation $\gamma_k$ is also provided to gain block L. The gains $l_\theta$, $l_\omega$, and $l_{60}$ are linear. In vector form, $$L = \begin{bmatrix} l_\theta \\ l_\omega \\ l_\alpha \end{bmatrix}.$$

The output signals from gain blocks L and G are added together and compared in a summer 52 to $x_k$. For the microprocessor-based implementation of state estimator 16', the continuous sliding mode observer equations given hereinabove are discretized with a zero-order hold (ZOH), as indicated in blocks L and G of FIG. 3 and as will be appreciated by those skilled in the art.

Despite the presence of linear gains, state estimator 16' functions solely as a sliding mode observer. The linear gains are utilized to increase the domains of acquisition of the observer. Although the construction of the sliding mode observer of FIG. 3 does not necessitate a thresholding technique, such as that described hereinabove with reference to FIG. 2, chattering may result from the high gains chosen in the conjunction with the sliding mode. Advantageously, however, state estimator 16' is robust with respect to noise and input perturbations.

Figure 4:
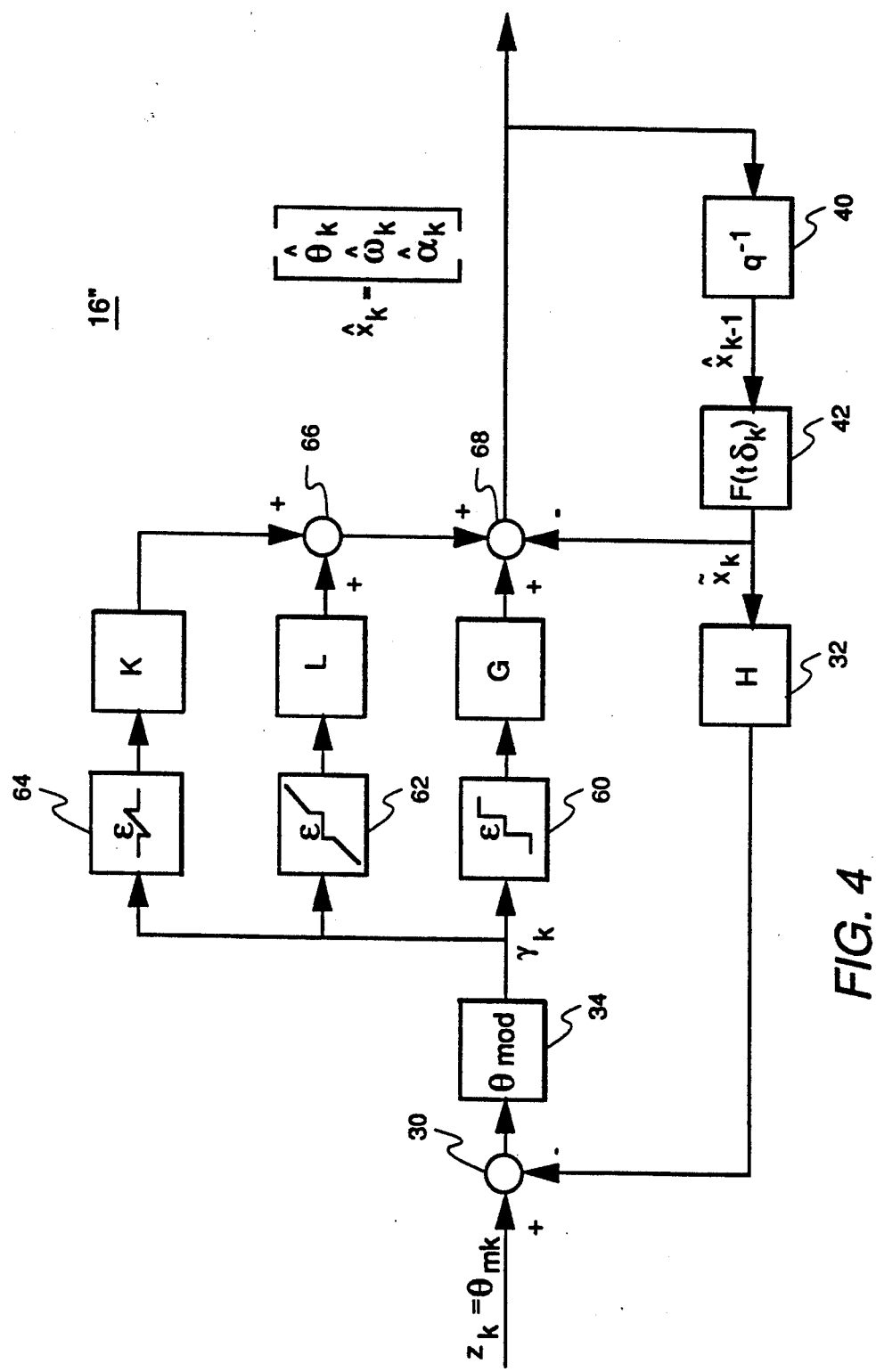
FIG. 4 is a block diagram of mechanical state estimator state employing a combination of a Kalman filter and sliding mode observer according to the preferred embodiment of the present invention.

FIG. 4 illustrates a preferred implementation of a state estimator 16' for use in the commutator of FIG. 1. The state estimator of FIG. 4 is a discretized combination of a sliding mode observer and a steady-state Kalman filter, with modified observer equations. The innovation $\gamma_k$ takes three paths, each of which employs a modified sign function In the first path, $\gamma_k$ is provided to a block 60 which represents the following modified sign function that incorporates a dead zone wherein the value of the function is zero:

$$\text{sign}(\cdot) = \frac{(\cdot)}{\|(\cdot)\|} \text{ if } \|(\cdot)\| > \epsilon;$$

$$\text{sign}(\cdot) = 0 \text{ if } \|(\cdot)\| \leq \epsilon.$$

The output signal from block 60 is provided to gain block G, described hereinabove. In the second path, $\gamma_k$ is provided to a modified sign block 62 which provides a linear output outside a dead zone, as illustrated. The output signal from block 62 is provided to gain block L, described hereinabove. In the third path, $\gamma_k$ is provided to another modified sign block 64 where, as illustrated, the value of the modified sign function is linear for inputs within a range defined by the closed interval $[-1,1]$ and is zero otherwise. The output signal from block 64 is provided to a gain block K, described hereinbelow. The output signals from gain blocks K and L are added together in a summer 66. The sum from summer 66 is added by a summer 68 to the output signal from gain block G, while $x_k$ is subtracted in summer 68. The output signal from summer 68 represents the estimate $x_k$.

For relatively small estimation errors, the state observer of FIG. 4 functions as a Kalman filter, i.e., a linear observer with steady-state Kalman gains K. The linear and sliding gains, denoted by L and G, respectively, in FIG. 4, are set to zero during this phase of operation. However, for relatively large estimation errors, the state observer of FIG. 4 functions as a nonlinear sliding mode observer utilizing both the linear and sliding gains L and G. Thus, the observer retains the beneficial properties of both the Kalman filter and the sliding mode observer without a significant increase in complexity or order of computation.

Other modifications of the sign function are possible in the embodiment of FIG. 4 for processing noisy position measurements and generating state estimates of position $\theta_k$, speed $\omega_k$, and acceleration $a_k$ of a rotating machine, as long as the functions are set-valued and operate in the closed interval $[-1,1]$. Moreover, by using the combination of a sliding mode observer and a Kalman filter, as illustrated in the preferred embodiment of FIG. 4, the need for a thresholding technique is avoided.

Figure 5:
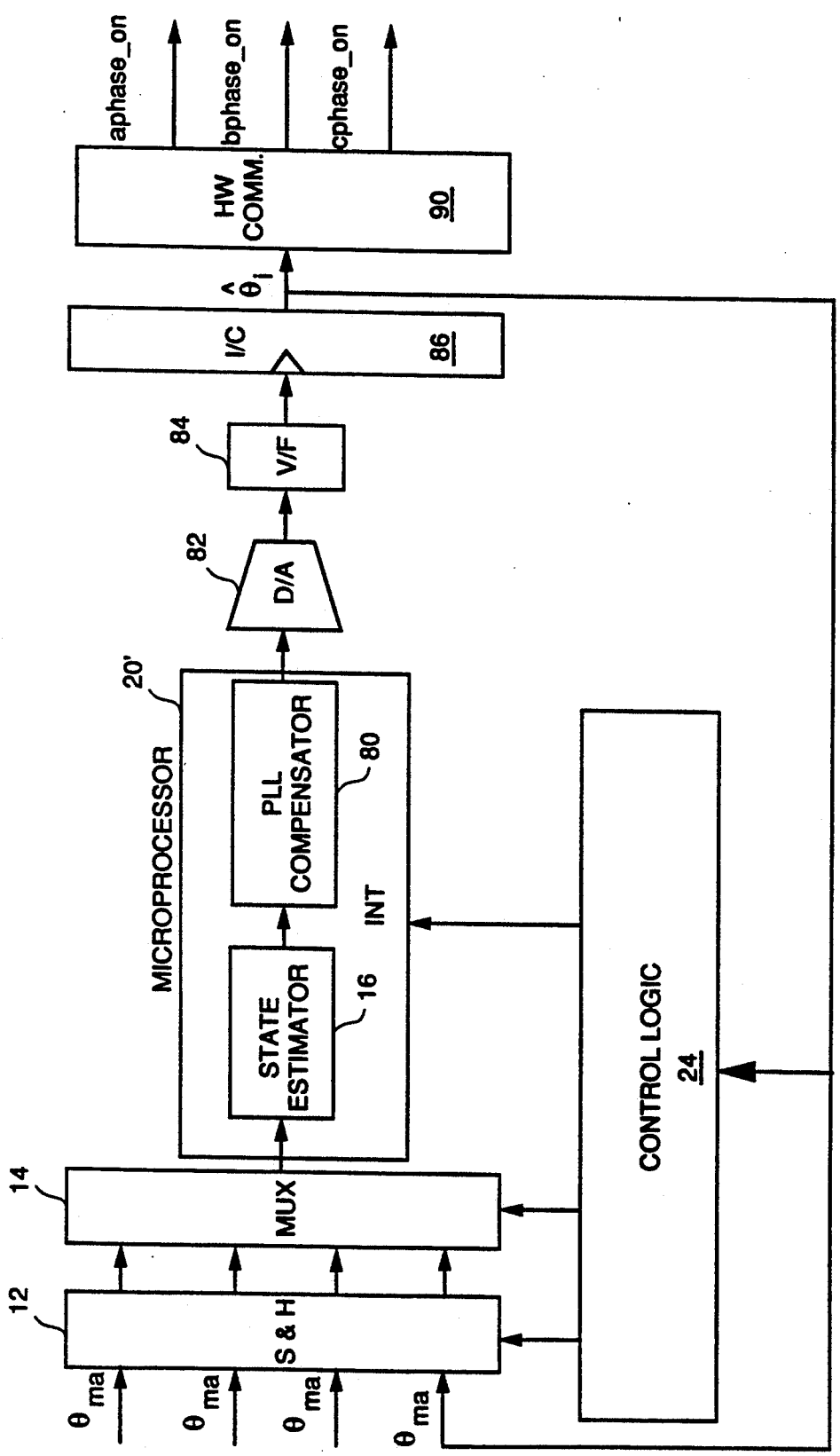
FIG. 5 is a block diagram of an alternative embodiment of a commutator according to the present invention.

FIG. 5 illustrates an alternative implementation of a commutator according to the present invention wherein a phase-locked loop (PLL) is employed for processing the mechanical state estimates (i.e., bipolar phase error signals) into machine phase commutation signals, rather than timer-based commutation, as illustrated in FIG. 1. In the embodiment of FIG. 5, the PLL is partially implemented in microprocessor software and partially implemented in hardware. The PLL software includes a loop compensator 80; and, the PLL hardware includes a digital-to-analog D/A converter 82, a voltage-to-frequency V/F converter 84, and an interpolator-counter 86. The microprocessor performs the phase error detection function of the PLL; the V/F converter performs the voltage-controlled oscillator (VCO) function of the PLL; and the interpolator-counter 86 performs the frequency integration function of the PLL. The microprocessor determines the phase error after each state estimator update by comparing a sampled interpolator angle estimate $\theta_i$ from interpolator-counter 86 with the current state estimate $\theta$. The update involves generating a new frequency command via the D/A converter. For an ideal V/F converter, the new frequency command, after phase lock, corresponds to the velocity $\omega$.

Figure 6:
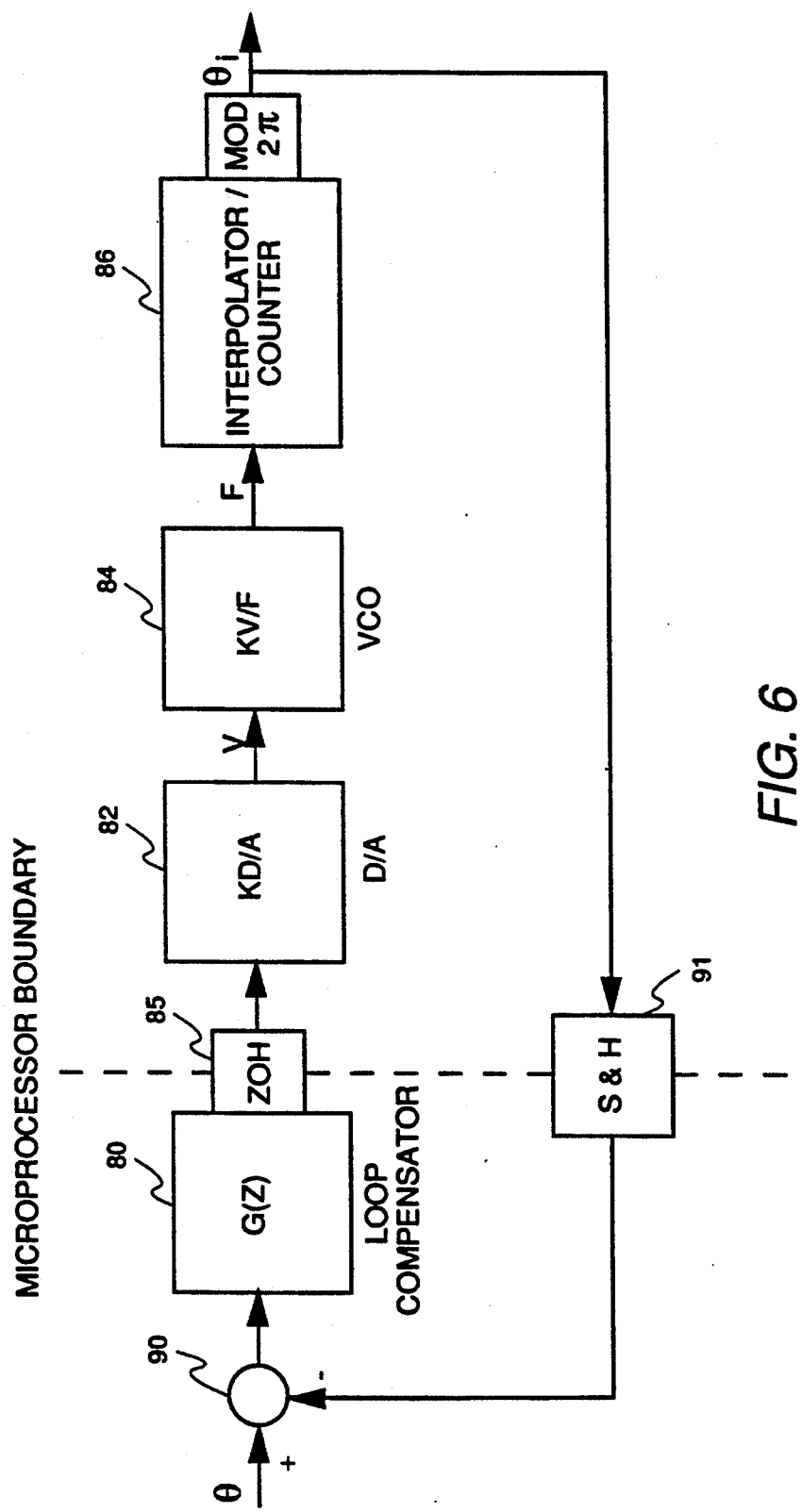
FIG. 6 is a block diagram of a phase-locked loop useful in the commutator of FIG. 5.

The PLL is illustrated in more detail in FIG. 6. In particular, the PLL includes a summer 90 for comparing the angle estimate $\theta$ from the state estimator with the interpolated angle output $\theta_i$ via a sample-and-hold circuit 91. The resulting error signal is provided to loop compensator 80, which includes a zero-order hold (ZOH) 85. The output signal form ZOH 85 is provided to D/A converter 82. The output signal from D/A converter 82 is converted to a frequency signal in V/F converter 84; and interpolator-counter 86 integrates the frequency signal to provide the interpolated angle output $\theta_i$.

The PLL interpolator-counter is capable of running freely without microprocessor updates for a predetermined period of time, thus allowing the microprocessor some time for soft-error recovery as required by, for example, a watch-dog time-out reinitialization sequence.

The output count $\theta_i$ from the interpolator-counter is preferably maintained at a greater resolution than required for commutation purposes. That is, the most significant output bits are used for commutation, while the lower order bits are ignored. If sufficient lower bits are thus reserved, effects of the PLL dynamics (i.e., oscillations of $\Delta\theta = \theta - \theta_i$) can be relegated to these lower order bits, thereby ensuring that the upper order bits are tracked.

As shown in FIG. 5, the output count $\theta_i$ from the interpolator-counter is provided to a hardware commutator 90, such as that described in commonly assigned U.S. Pat. No. 4,739,240 of S. R. MacMinn and P. M. Szczesny, issued Apr. 19, 1988 and incorporated by reference herein.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A commutator for an electronically commutated machine, comprising:

input means for sampling noisy angular position measurements;

state observer means for processing each respective noisy angular position measurement and generating therefrom discrete estimates of mechanical states of the machine, said mechanical states including at least shaft position and velocity, said state observer means comprising a Kalman filter of variable gain; and signal processing means for generating phase commutation signals from said discrete estimates for commutating each respective phase of said electronically commutated machine, said signal processing means comprising commutation predictor means for determining a next commutation instant for each respective phase based on said discrete estimates and generating timing signals corresponding thereto, said signal processing means further comprising timer means for receiving said timing signals and generating commutation signals to each respective phase for commutation at the commutation instants determined by said commutation predictor means.

2. The commutator of claim 1 wherein said state observer means further generates a discrete estimate of acceleration from said noisy position estimates.

3. A commutator for an electronically commutated machine, comprising:

input means for sampling noisy angular position measurements;

state observer means for processing each respective noisy angular position measurement and generating therefrom discrete estimates of mechanical states of the machine, said mechanical states including at least shaft position and velocity, said state observer means comprising a Kalman filter of variable gain; and signal processing means for generating phase commutation signals from said discrete estimates for commutating each respective phase of said electronically commutated machine, said signal processing means comprising a phase-locked loop, including interpolated-counter means, for generating an interpolated position estimate between discrete state estimates for each respective phase, said signal processing means further comprising commutation signal generating means for receiving said interpolated position estimates and generating commutation signals to each respective phase for commutation at the interpolated position determined by said interpolator-counter means.

4. A commutator for an electronically commutated machine, comprising:

input means for sampling noisy angular position measurements;

state observer means for processing each respective noisy position measurement and generating therefrom discrete estimates of mechanical states of the machine, said mechanical states including at least shaft position and velocity, said state observer means comprising a sliding mode observer; and signal processing means for generating phase commutation signals from said discrete estimates for commutating each respective phase of said electronically commutated machine, said signal processing means comprising commutation predictor means for determining the next commutation instant for each respective phase based on said discrete estimates and generating timing signals corresponding thereto, said signal processing means further comprising timer means for receiving said timing signals and generating commutation signals to each respective phase for commutation at the commutation instants determined by said commutation predictor means.

5. A commutator for an electronically commutated machine, comprising:

input means for sampling noisy angular position measurements;

state observer means for processing each respective noisy position measurement and generating therefrom discrete estimates of mechanical states of the machine, said mechanical states including at least shaft position and velocity, said state observer means comprising a sliding mode observer; and signal processing means for generating phase commutation signals from said discrete estimates for commutating each respective phase of said electronically commutated machine, said signal processing means comprising a phase-locked loop, including interpolator-counter means, for generating an interpolated position estimate between discrete state estimates for each respective phase, said signal processing means further comprising commutation signal generating means for receiving said interpolated position estimates and generating commutation signals to each respective phase for commutation at the interpolated position determined by said interpolator-counter means.

6. A commutator for an electronically commutated machine, comprising:

input means for sampling noisy angular position measurements;

state observer means for processing each respective noisy position measurement and generating therefrom discrete estimates of mechanical states of the machine, said mechanical states including at least shaft position and velocity, said state observer means comprising a combination of a Kalman filter and a sliding mode observer; and signal processing means for generating phase commutation signals from said discrete estimates for commutating each respective phase of said electronically commutated machine, said signal processing means comprising commutation predictor means for determining the next commutation instant for each respective phase based on said discrete estimates and generating timing signals corresponding thereto, said signal processing means further comprising timer means for receiving said timing signals and generating commutation signals to each respective phase for commutation at the commutation instants determined by said commutation predictor means.

7. A commutator for an electronically commutated machine, comprising:

input means for sampling noisy angular position measurements;

state observer means for processing each respective noisy position measurement and generating therefrom discrete estimates of mechanical states of the machine, said mechanical states including at least shaft position and velocity, said state observer means comprising a combination of a Kalman filter and a sliding mode observer; and signal processing means for generating phase commutation signals from said discrete estimates for commutating each respective phase of said electronically commutated machine, said signal processing means comprising a phase-locked loop, including interpolator-counter means, for generating an interpolated position estimate between discrete state estimates for each respective phase, said signal processing means further comprising commutation signal generating means for receiving said interpolated position estimates and generating commutation signals to each respective phase for commutation at the interpolated position determined by said interpolator-counter means.

8. The commutator of claim 3 wherein said state observer means further generates a discrete estimate of acceleration from said noisy position estimates.

9. The commutator of claim 4 wherein said state observer means further generates a discrete estimate of acceleration from said noisy position estimates.

10. The commutator of claim 5 wherein said state observer means further generates a discrete estimate of acceleration from said noisy position estimates.

11. The commutator of claim 6 wherein said state observer means further generates a discrete estimate of acceleration from said noisy position estimates.

12. The commutator of claim 7 wherein said state observer means further generates a discrete estimate of acceleration from said noisy position estimates.

* * * * *